June 28, 1966 L. G. FIEGE 3,258,650

CIRCUIT COMPONENT BOARD NESTS AND ELEMENT THEREOF

Filed April 4, 1963

INVENTOR

LOUIS G. FIEGE,

BY: Smith, Michael & Gardiner,

ATTORNEYS.

3,258,650
CIRCUIT COMPONENT BOARD NESTS AND ELEMENT THEREOF

Louis Gail Fiege, 1807 Aberdeen Road, Baltimore, Md.
Filed Apr. 4, 1963, Ser. No. 270,583
11 Claims. (Cl. 317—101)

This invention relates generally to circuit "libraries," or assemblies of printed circuit cards or circuit component boards removably mounted in electrically operative position in a card enclosure. The complete assembly is frequently referred to as a "nest," while the card enclosure is known variously as a "cage," "box," "support," or "rack."

Such circuit "nests" are receiving increasingly widespread use as the demands for more compact, complex and versatile electronic circuitry become more pressing. These demands are felt particularly in the fields of electronic data processing, where high initial acquisition costs dictate that a given installation be capable of use in filling a variety of needs. In such installations, the demand for compactness has led to the development, over a period of recent years, of improved miniaturized circuit components which in turn are mounted in electrically operative relationship on circuit component cards, often of the printed or etched circuit type. Each card may comprise a circuit designed to perform a predetermined function, which function is merely a small part of the total task to be performed by the data processing apparatus. In order to properly interrelate the numerous cards necessary to establish the total circuitry, while maintaining a compact assembly, the cards are frequently formed in modular fashion (i.e.: each card having substantially the same dimensions of width and length), provided with plug-in connectors, and assembled in side-by-side relationship in a "nest" such as illustrated in the Tarczy-Hornoch U.S. Patent No. 3,014,161 of December 19, 1961, or the Marks U.S. Patent No. 3,026,453 of March 20, 1962.

As pointed out in the aforesaid Marks patent, it is desirable to be able to interchange individual circuit cards in such "nests" either for the purpose of replacement of defective circuits or for the purpose of rearranging or substituting different circuits to perform functions meeting various needs of the user of the data processing apparatus. Frequently in carrying out such substitutions, it is found that a different number of cards will be needed, and/or cards will be encountered which have different size components and therefore require a different spacing from each other when in the circuit "nest." Thus, the need for a changeable spacing of the circuit cards is met in the disclosure of the aforesaid Marks patent by the provision of "snap-in" plastic card guides or tracks which are held in place in slotted retainer bars by flexible mounting studs which resiliently snap into position in the mounting slots of the retainer bars. An assembly of a pair of retainer bars and card tracks is frequently referred to as a "ladder."

The present invention relates to such a "nest," and to "ladders" and a circuit board track for use therein, and has as its objects;

(1) The provision of a "ladder" construction wherein the circuit board tracks and the retainer bars can be readily and economically formed of metal stampings, (2) The provision of a metallic circuit board track which may provide a conductive path between a circuit "nest" frame and a conductive portion of a circuit board, (3) The provision of a circuit board track which will accommodate circuit boards of varying thickness while maintaining firm engagement of the board regardless of its thickness within predetermined limits, (4) The provision of a metallic circuit board track having resilient supporting tongues which function to urge the track into firm engagement with the edges of the circuit board retained therein, (5) The provision of a circuit board track having resilient supporting tongues which function to urge the track into engagement with the edges of a circuit board regardless of the width of the board within certain predetermined limits, (6) The provision of a circuit board track having resilient supporting tongues which function to urge the track into engagement with the edges of a circuit board regardless of slight deviations of the opposite side edges of said board from true parallelism, (7) The provision of a conductive "ladder" construction wherein circuit component tracks are provided with resilient supporting tongues so dimensioned as to snap into place in apertures provided in the supporting retainer bars of the ladder and to maintain firm conductive engagement with the side edges of said apertures.

The manner in which this invention accomplishes the foregoing and other objects and advantages, will be more readily understood by reference to the following description of an embodiment of the invention, and by reference to the accompanying drawing, in which.

Figure 1:
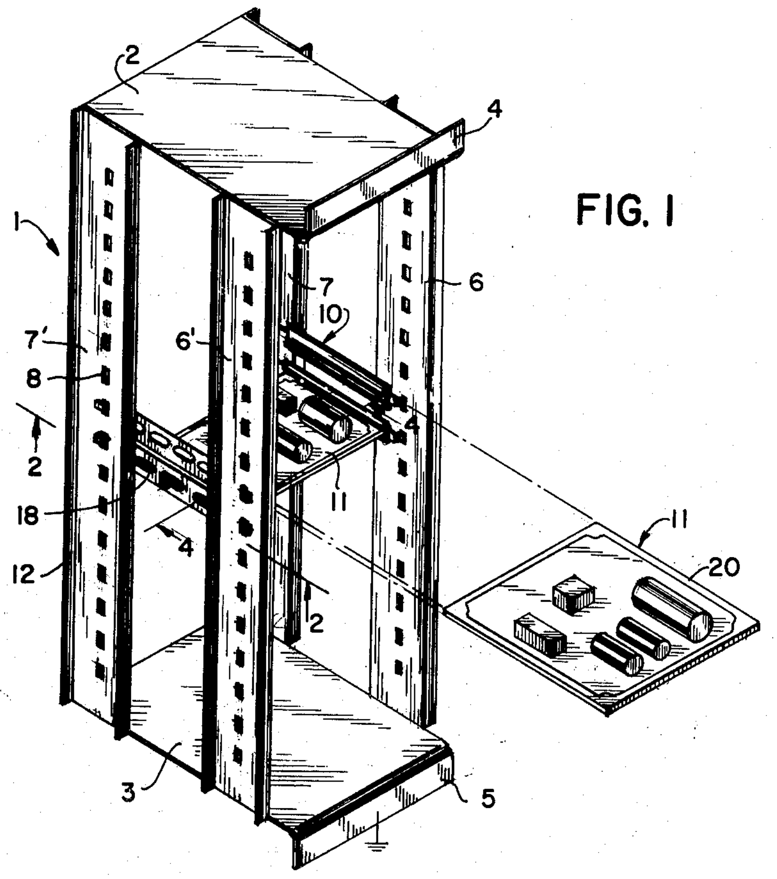
FIGURE 1 is a perspective view of a circuit "nest" according to the present invention in which one circuit component board is depicted as disassembled from the nest but aligned with a track pair as during assembly or disassembly.

As shown in FIGURE 1, a circuit "nest" generally designated by the reference numeral 1, comprises end plates 2 and 3, provided at their front edges with flanges 4 and 5, respectively, to facilitate mounting in an electrical apparatus supporting frame (not shown). The end plates 2 and 3 are interconnected by front and rear retainer bars 6, 6' and 7, 7', respectively. Each of said retainer bars is provided with a plurality of vertically spaced apertures 8 adapted to receive the supporting tongues 9 of tracks 10 which, in turn, provide a support for a conventional printed circuit board or a conventional "fabricated" circuit component board 11. Preferably, the apertures 8 are of rectangular form as illustrated in FIGURE 1. Each retainer bar may advantageously be provided with one or more reinforcing ridges or flanges, shown in this particular embodiment as flanges 12.

The circuit board tracks 10 comprise an elongated body 13 and a pair of resilient supporting tongues 9. The body 13 includes a base 15 and channel forming wall members 16 extending upwardly and inwardly of the base 15 along the side edges thereof. The upper free edges of the wall members 16 are disposed in parallel spaced juxtaposed relationship to each other to provide a circuit board receiving channel 14 therebetween. The base 15 may be provided with a series of spaced openings 18 to reduce the weight of the structure. The wall members 16 may be provided along their free edges with runner members 19 to provide a smooth surface to engage the circuit boards 11 in a manner to avoid marring of the latter. Re-entrant bends 17 formed at the juncture of the base 15 and the wall members 16 together with the inherent resiliency of the material employed, provided a flexible, yet firm, spring action effective against both upper and lower surfaces of the circuit board 11 adjacent to side edges thereof and throughout the entire, or substantially the entire, length thereof. The combined width of each runner 19 and wall member 16, and the angle of the re-entrant bend 17 are so chosen with respect to the width of the base 15 of the body portion 10 as to provide a circuit board receiving channel 14 of a width slightly less than the thickness of the thinnest circuit board to be accommodated in the "nest." Thus, firm clamping engagement is assured with any circuit board employed even though accepted tolerances permit relatively wide variations in thickness between different boards.

The firm clamping engagement between the free edges of the wall members 16 and the upper and lower board surfaces adjacent the side edge portions of the circuit board 11, together with a resilient engagement of the base portion 15 with the edge of the board 11 in a manner yet to be described, results in support of the circuit board within the "nest" free from vibration. Further, it is conventional in circuit boards of the type employed with the present invention, to provide a common, or "ground" circuit 20 (FIGURE 1) extending around the circuit board adjacent the outer periphery thereof where it is disposed favorably for connection to the numerous locations on the board where circuit continuity to "ground" must be provided. These connections are conventionally made by bringing the component leads (not shown) directly to the peripheral ground circuit in a manner illustrated by U.S. Patent 2,967,979, issued January 10, 1961, to E. W. Pleaser et al., or by providing extensions of the printed ground circuit paths to directly contact the circuit components as seen in U.S. Patent 3,116,101 issued December 31, 1963, to J. M. Kikta. It is important that the common or "ground" circuit integrity be maintained throughout the entire appartus, and to this end it may be desirable to provide a path between the "ground" circuit of the boards and the apparatus frame (not shown) through the circuit board tracks, thereby providing the shortest possible current path. The track runner members 19, being maintained in firm clamping engagement with the ground circuit on the peripheral portions of the surface of the board, may provide the necessary conductive path, and thus a further advantage of the resilient clamping structure is realized.

Figure 2:
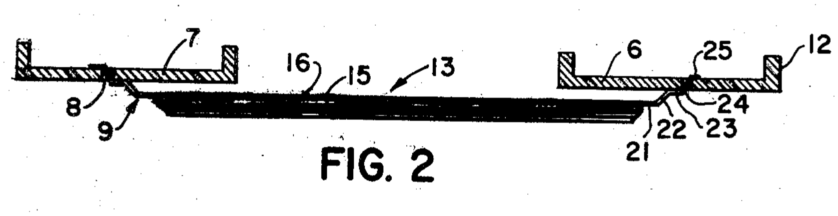
FIGURE 2 is a sectional view of a "ladder" assembly taken on line 2—2 of FIGURE 1.
Figure 3:
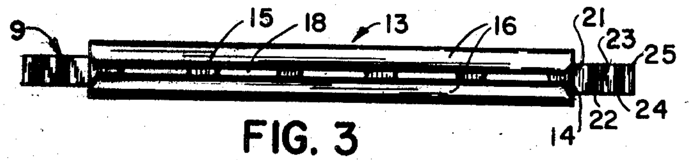
FIGURE 3 is a side elevation view of an individual track.

The circuit board tracks 10 further comprise resilient supporting tongues 9 extending from the base portion 15, each of which comprises a stepped structure illustrated most clearly in FIGURE 2. The base 15 may optionally include extensions 21 to which the tongues 9 are joined.

The tongues each include an angularly related camming portion 22, an inner contacting portion 23 lying in a plane substantially parallel to the plane of said base portion 15, an angularly related connecting portion 24, and may include an outer contacting portion 25 also lying in a plane substantially parallel to the plane of the base portion 15. The contact portions 23 and 25 are adapted to engage the inner and outer surfaces, respectively, of the retainer bars 6, 6', 7, 7' as shown in FIGURE 2. The angular relationship between the contacting portions 23 and 25 and the portions 22 and 24 aids in imparting the desired degree of resiliency to the tongue 9 and thereby contributes to providing readily detachable yet firm engagement of the connecting portion 24 with the walls defining the aperture 8, and urging the base portion 15 of the body 13 into firm engagement with the side edge of the circuit card. The portions 22 and 24 of a particular tongue lie in substantially parallel planes the planes of the tongues at opposite ends of a track unit diverging outwardly from each other and preferably are disposed at an angle of between 30° and 60° with respect to the plane of the base 15, and the portions 21, 23 and 25 lie in a plane parallel to the plane of the base 15.

In the assembly of a "ladder" constructed in accordance with this invention, a set of four apertures 8, one in each of the retainer bars 6 and 7 and 6' and 7', are selected so as to provide the desired spacing of the circuit board tracks along the ladder. The outer contacting portion 25 of the rear tongue 9 of a track 10 is passed through the selected aperture 8 in a rear retainer bar 7 or 7' so that the connecting portion 24 passes into and remains within the selected aperture 8. The forward end of the track 10 is then swung towards the forward retainer bar 6 or 6' so that the outer contacting portion 25 of the forward tongue 9 lies in close proximity to the selected aperture 8 in retainer bar 6 or 6'. A moderate pressure is then brought to bear on the forward resilient tongue 9 to bring the outer contacting portion 25 into alignment with said aperture 8, at which time the portion 25 is passed through the aperture 8 to bring the connecting portion 24 within the aperture in the same manner as in assembling the rear connection described above. The pressure on the tongue 9 is then released and resiliency of the tongue causes it to snap into position as illustrated in FIGURE 2. It will be noted from an examination of FIGURE 2 that the connecting portion 24 of the tongue 9 extends diagonally through the aperture 8 in a manner such that one surface of said portion 24 is in engagement with the edge formed by the junction of the wall defining said aperture 8 and the inner surface of the retainer bars 6 and 7 whereas the opposite surface of the portion 24 is in contact with the edge formed by the junction of the wall defining said aperture 8 and the outer surface of the retainer bars 6 and 7 at a point diagonally opposite said first mentioned point of contact. Further, the outer contacting portion 25 is adapted to lie against the outer surface of the retainer bars 6 and 7 whereas the inner contacting portion 23 is adapted to lie against the inner surface of the retainer bars. Thus a firm resilient engagement of the track 10 with the retainer bars 6 and 7 is established which will accommodate slight differences in the spacing between apertures 8 of front and rear retainer bars 6 and 7 respectively. The spacing of the retainer bars 6 and 7 of a ladder assembly is preferably such that the respective apertures 8 are disposed from each other at a distance slightly less than the distance between the connecting portions 24 of the supporting tongues 9 of a circuit board track 10. Thus, the resilient tongues 9 are maintained in a slightly flexed, or prestressed condition to assure firm engagement and good electrical contact between track 10 and retainer bars 6 and 7 for "ground" circuit continuity. The resilient structure absorbs vibration or distortion of the "nest" without passing such vibration or distortion on to the circuit board and will permit the track to be readily engaged and disengaged from the retainer bars for assembly and disassembly or rearrangement thereof within the "nest."

The aforesaid assembly process is, of course, repeated with another track on the opposite pair of retainer bars 6' and 7', after which a circuit board 11 may be engaged with the card receiving channels 14 of a track pair and the board moved into position as indicated in FIGURE 1 and in a manner to be hereinafter described.

Figure 4:
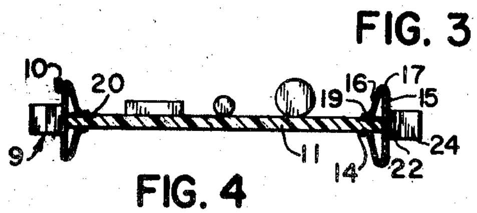
FIGURE 4 is a cross sectional view of a circuit board and a track pair taken on line 4—4 of FIGURE 1.

The spacing of the retainer bars 6 and 7 from the bars 6' and 7', respectively, is so chosen that the base portions 15 of a track pair will be spaced from each other in opposed relationship at a distance slightly less than the minimum width of circuit board which is to be accommodated therein. As a board 11 is aligned with a track pair and moved into position to engage the circuit board receiving channels 14, the corners of the board first engage the camming portion 22 of each track of the pair. Further inward movement of the board results in the corners of the board acting against the inclined camming portions 22 of the resilient tongues 9 with a camming action to simultaneously move the body portions of both tracks of the pair outwardly toward the respective planes of the associated retainer bars 6, 7 and 6', 7'. Thus, the body portions 13 are moved outwardly toward said planes only to the extent dictated by the overall width of the particular circuit board being mounted within the "nest," and the base 15 of said body portion 13 will remain in firm engagement with the side edges of the circuit board, as shown in FIGURE 4, despite variations in overall width between different boards within predetermined limits. In addition to the aforesaid variation in circuit board widths, which under presently accepted tolerances may be as much as +.060 inch, the oposite side edges of a given board may deviate slightly from absolute parallelism. In such cases, the resilient tongues 9 at opposite ends of a given track may flex to a different degree to again assure firm engagement of the base 15 with the side edge of the circuit board throughout substantially the entire length of the board.

As the body portion 10 of the track is displaced outwardly by the board, the flexing of the camming portions 22 will cause the inner contacting portions 23 to slide along the inner surfaces of the retainer bars 6 and 7 to a degree dependent upon the amount of displacement, which in turn is dependent upon the width of the board. As this movement becomes more pronounced, the inclined connecting portions 24 are pressed against the edges formed by the junctions of the walls defining the apertures 8 and the outer surfaces of the retainer bars 6 and 7, causing the connecting portions 24 to move further through the apertures 8. While this operation may cause the outer contacting portions 25 to be forced away from engagement with the outer surface of the retainer bars, the inner contacting portions 23 will be retained in firm engagement with the inner surface of the retainer bars 6 and 7, thus maintaining the aforementioned firm connection. Thus a relatively wide variation in circuit board width may be accommodated within the "nest" without the sacrifice of structural stability or of circuit integrity.

While the particular embodiment set forth in the foregoing specification has been described as utilizing metallic tracks, it will be obvious that other materials exhibiting similar properties of resiliency and electric conductivity, such as a conductive plastic, may be used. Similarly, non-conductive materials may be used in installations where "ground" circuit integrity is not essential, and varying degrees of resiliency may be accomplished through the appropriate choice of materials and dimensions.

It is apparent from the foregoing that the invention herein described provides an improved circuit board "nest" which combines the versatility of snap-in circuit board tracks with structural stability and circuit integrity not heretofore obtained in such structures.

It will be readily apparent to those skilled in the art that many modifications of the specific embodiment disclosed herein may be made without departing from the spirit of the present invention or the scope of the invention as defined in the following claims.

I claim:

1. A circuit board supporting track comprising an elongated body provided with a circuit board receiving channel extending longitudinally thereof and means for removably and resiliently supporting said body, said means comprising resilient supporting tongues, each said tongue including a camming portion joined to an end of said body, an inner contacting portion, a connecting portion, and an outer contacting portion joined in that order, said inner and outer contacting portions lying in planes substantially parallel to the general plane of said body, and said camming portion and said connecting portion lying in planes transverse to the axis of said body and diverging outwardly from each other and angularly related to said parallel planes.

2. A circuit board supporting track as set forth in claim 1 wherein said angular relationships are within the range of 30° to 60°.

3. A circuit board supporting track comprising;

(1) an elongated body, said body including (A) a generally planar base portion, (B) a circuit board receiving channel extending longitudinally of said body, and (2) means providing removable and resilient support for said body, said means comprising resilient supporting tongues, each said tongue including (A) a camming portion joined to an end of said base, said camming portions of respective tongues being disposed in planes transverse to the axis of said body and diverging outwardly from each other, (B) a contacting portion joined to said camming portion, said contacting portions of respective tongues being disposed in a plane substantially parallel to the plane of said base, and (C) a connecting portion joined to said contacting portion, said connecting portions of respective tongues being disposed in planes transverse to the axis of said body and diverging outwardly from each other.

4. The circuit board supporting track as set forth in claim 3 wherein each said resilient supporting tongue includes an outer contacting portion extending from said connecting portion and being disposed in a plane substantially parallel to the planes of said base and said inner contacting portion.

5. A circuit board supporting track comprising an elongated body portion and means providing removable and resilient support for said body, said means comprising at least a pair of resilient supporting tongues, (1) said elongated body portion being of substantially C-shaped cross section and including (A) a generally planar base portion and (B) longitudinally extending wall members, said wall members (1) being joined integrally to said base portion by areas of juncture extending throughout substantially the entire length of said body, (2) extending upwardly and inwardly of said base portion, (3) having free upper edges disposed in spaced parallel relation to each other, and (4) defining a circuit board receiving channel between said edges and disposed inwardly of said juncture area and in spaced relationship to the general plane of said base portion, (2) each said resilient supporting tongue being of generally stepped configuration including (A) a camming portion joined to said base, said camming portions of respective tongues being disposed in planes transverse to the axis of said body and diverging outwardly from each other, (B) a contacting portion joined to said camming portion and disposed in a plane substantially parallel to the general plane of said base, and (C) a connecting portion joined to said contacting portion, said connecting portions of respective tongues being disposed in planes transverse to the axis of said body and diverging outwardly from each other.

6. The circuit board supporting track as set forth in claim 5, wherein each said resilient supporting tongue further includes (D) an outer contacting portion joined to and extending from said connecting portion in a plane substantially parallel to the plane of said inner contacting portion.

7. A circuit board ladder assembly comprising at least a pair of elongated retainer bars, means mounting said retainer bars in spaced parallel relationship, and a plurality of circuit board supporting tracks, (1) each said retainer bar being provided with a plurality of apertures spaced therealong, (2) each said circuit board supporting track comprising (A) an elongated body, said body including (1) a generally planar base portion,
(2) a circuit board receiving channel extending longitudinally of said body, and
(B) means providing removable and resilient support for said body, said means comprising resilient supporting tongues, each said tongue including
(1) a camming portion joined to an end of said base, said camming portions of respective tongues being disposed in planes transverse to the axis of said body and diverging outwardly from each other,
(2) a contacting portion joined to said camming portion, said contacting portions of respective tongues being disposed in a plane substantially parallel to the plane of said base, and
(3) a connecting portion joined to said contacting portion, said connecting portions of respective tongues being disposed in planes transverse to the axis of said body and diverging outwardly from each other, said circuit board supporting tracks mounted on and extending between said retainer bars, each said connecting portion of said tongues extending through an aperture of the respective retainer bar and engaging the diagonally opposite edges thereof to provide firm resilient supporting contact of said supporting tracks with said retainer bars.

8. The circuit board ladder assembly as set forth in claim 7 wherein said spacing means is so dimensioned that the respective apertures of each retainer bar are disposed at a distance from each other slightly less than the distance between the connecting portions of the corresponding supporting tongues of a circuit board track, whereby said resilient supporting tongues are maintained in a flexed condition by engagement with the edges of the apertures.

9. The circuit board ladder assembly as set forth in claim 7 wherein each said resilient supporting tongue further includes
(4) an outer contacting portion joined to and extending from said connecting portion in a plane substantially parallel to the plane of said inner contacting portion, said inner contacting portion and said outer contacting portion being adapted to contact the respective opposite sides of said retainer bars adjacent to said apertures.

10. A circuit board nest, said nest comprising a pair of circuit board ladder assemblies and means mounting said ladder assemblies in opposed spaced parallel relationship,
(1) each said ladder assembly comprising at least a pair of elongated retainer bars, means mounting said retainer bars in spaced parallel relationship, and a plurality of circuit board supporting tracks,
(A) each said retainer bar being provided with a plurality of apertures spaced therealong,
(B) each said circuit board supporting track comprising
(1) an elongated body, said body including
(a) a generally planar base portion,
(b) a circuit board receiving channel extending longitudinally of said body, and
(2) means providing removable and resilient support for said body, said means comprising resilient supporting tongues, each said tongue including (a) a camming portion joined to an end of said base, said camming portions of respective tongues being disposed in planes transverse to the axis of said body and diverging outwardly from each other,
(b) a contacting portion joined to said camming portion, said contacting portions of respective tongues being disposed in a plane substantially parallel to the plane of said base,
(c) a connecting portion joined to said contacting portion, said connecting portions of respective tongues being disposed in planes transverse to the axis of said body and diverging outwardly from each other,
(d) an outer contacting portion joined to and extending from said connecting portion in a plane substantially parallel to the plane of said inner contacting portion, said circuit board supporting tracks mounted on and extending between said retainer bars, each said tongue extending through an aperture of the respective retainer bar and engaging the diagonally opposite edges thereof to provide firm resilient supporting contact of said supporting tracks with said retainer bars,
(2) said ladder mounting means being so dimensioned that said ladder assemblies are disposed at a distance from each other whereby the distance between said base portions of opposed supporting tracks is slightly less than the minimum width of the circuit board to be supported therein.

11. A circuit board nest as set forth in claim 10 wherein said spacing means is so dimensioned that the respective apertures of each retainer bar are disposed at a distance from each other slightly less than the distance between the connecting portions of the corresponding supporting tongues of a circuit board track, whereby said resilient supporting tongues are maintained in a flexed condition by engagement with the edges of the apertures, whereby camming engagement of said camming portions of said supporting tongues by the edges of a circuit component board being assembled therein will further flex said end portions to provide firm engagement of the circuit component board with the retaining track.

References Cited by the Examiner

UNITED STATES PATENTS

| | | | |
|---|---|---|---|
| 2,123,796 | 7/1938 | Peters | 40—208 |
| 2,917,601 | 12/1959 | Hatchett | 317—101 |
| 3,026,453 | 3/1962 | Marks | 339—17 |
| 3,098,177 | 7/1963 | Bleier | 174—68.5 |

FOREIGN PATENTS

| | | |
|---|---|---|
| 1,249,261 | 11/1960 | France. |

KATHLEEN H. CLAFFY, *Primary Examiner.*

JOHN F. BURNS, *Examiner.*

J. G. COBB, J. J. BOSCO, *Assistant Examiners.*